No. 729,479.  
Patented May 26, 1903.

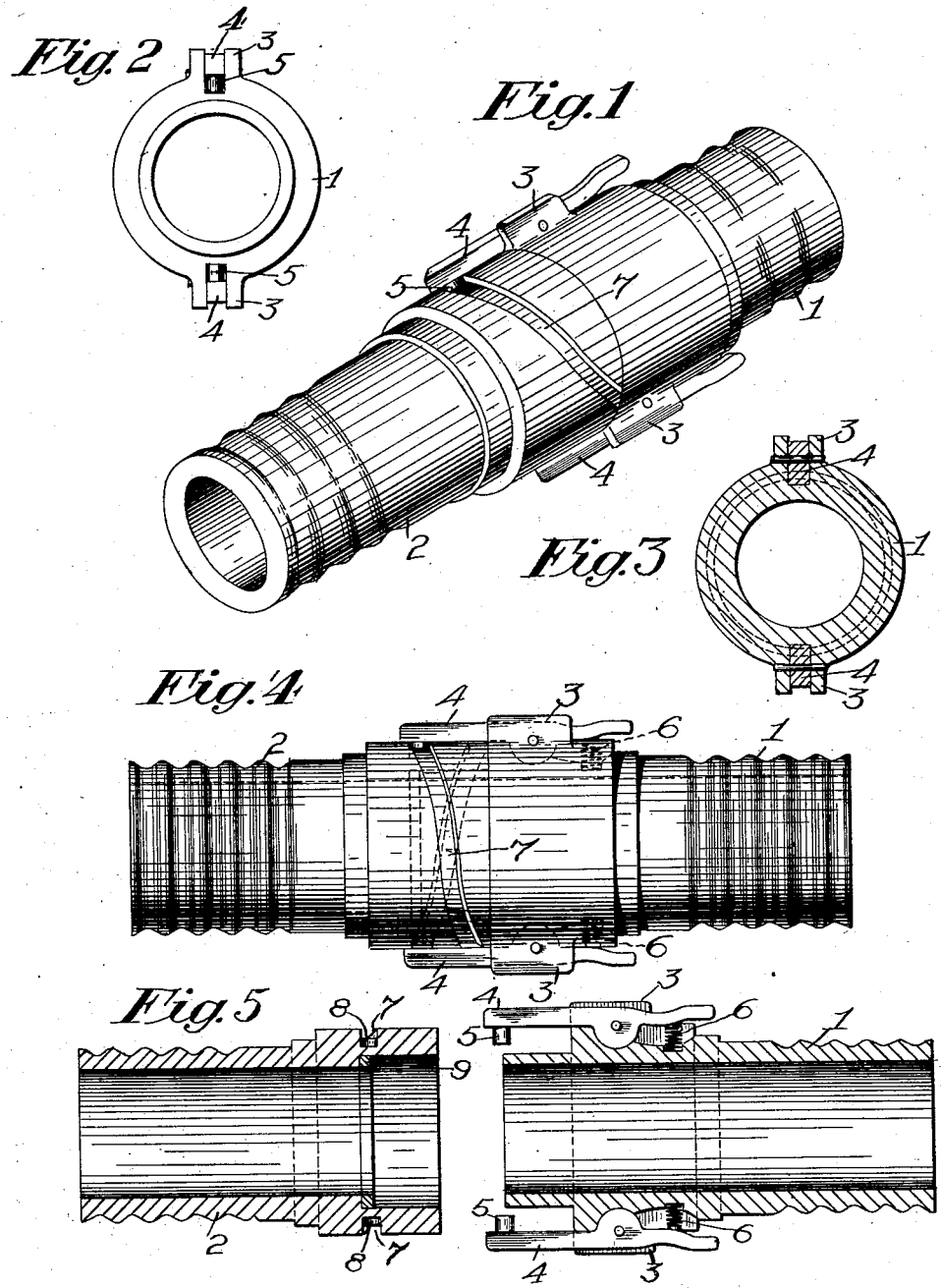

UNITED STATES PATENT OFFICE.

JACOB WITTMAN, OF PITTSBURG, PENNSYLVANIA.

HOSE-COUPLING.

SPECIFICATION forming part of Letters Patent No. 729,479, dated May 26, 1903.

Application filed January 5, 1903. Serial No. 137,952. (No model.)

*To all whom it may concern:*

Be it known that I, JACOB WITTMAN, a citizen of the United States of America, residing at Pittsburg, in the county of Allegheny and State of Pennsylvania, have invented certain new and useful Improvements in Hose-Couplings, of which the following is a specification, reference being had therein to the accompanying drawings.

This invention relates to certain new and useful improvements in hose-couplings, and relates more particularly to that class that may be readily coupled without the use of screw-threads.

The present invention has for its object the provision of novel means whereby a water-tight coupling may be obtained that will be strong, durable, and comparatively inexpensive to manufacture.

With the above and other objects in view the invention consists in the novel construction, combination, and arrangement of parts to be hereinafter more fully described, and specifically pointed out in the claim.

In describing the invention in detail reference is had to the accompanying drawings, forming a part of this specification, and wherein like numerals of reference indicate like parts throughout the several views, in which—

Figure 1 is a perspective view of my improved hose-coupling. Fig. 2 is a front elevation thereof. Fig. 3 is a vertical sectional view. Fig. 4 is a side elevation. Fig. 5 is a longitudinal vertical sectional view showing the male and female members of the coupling disconnected.

In the drawings the reference-numeral 1 represents the male member, and 2 the female member, of the coupling. Upon the male member 1 are formed lugs 3, between which are pivotally secured operating-levers 4, which carry studs 5 on their under faces and at their forward end. The other end of the operating-levers is engaged by spiral springs 6, engaging the under faces of the levers. These springs are secured in suitable recesses which form seats for the springs. The female member 2 of the coupling has formed on its exterior a spiral groove 7, which terminates in recesses 8, forming seats to receive the studs 5 of the operating-levers. A gasket or washer 9 is arranged in the female member 2, which forms a water-tight connection between the parts when coupled together.

The operation of my improved hose-coupling is as follows: The operating-levers 4 are compressed, thereby permitting the female member to be placed in position, and the studs 5 will ride in the spiral groove until they are seated in the recesses formed in this groove, and the extension of the member 1 will abut against the washer 9, forming a perfectly water-tight joint. The spiral grooves act as screw-threads, giving the same effect when engaged by the studs of the levers, serve as bearing for the studs on the levers, and permit the same to exert a force tending to draw the parts together, the studs seating in the recesses in the grooves when the male and female sections are in close contact. In order to uncouple the hose-sections, it is only necessary to again depress the springs and operating-levers, thereby disengaging the studs from their seats and permitting the section 2 to be turned and disengaged from the section 1.

The many advantages obtained by the use of my improved device will be readily apparent from the foregoing description, taken in connection with the accompanying drawings.

It will be noted that various changes may be made in the details of construction without departing from the general spirit of my invention.

Having fully described my invention, what I claim as new, and desire to secure by Letters Patent, is—

In a hose-coupling, the combination of a male and female section, pivoted operating-levers carried by one of said sections, means seated in said lever-carrying section for operating said levers, a groove formed in the other of said sections extending around the same at an angle to the longitudinal axis of said sections, said groove having seats formed at the ends thereof, and means integral with the levers adapted to engage with the groove, adapted upon rotation of one member to draw the coupling together, substantially as described.

In testimony whereof I affix my signature in the presence of two witnesses.

JACOB WITTMAN.

Witnesses:
H. C. EVERT,
A. M. WILSON.